US009705757B2

United States Patent
Chen et al.

(10) Patent No.: US 9,705,757 B2
(45) Date of Patent: Jul. 11, 2017

(54) METHOD AND TERMINAL, INPUT METHOD AND DEVICE, CLOUD SERVICE CARD, AND SYSTEM FOR ACQUIRING SERVICE

(71) Applicant: HUAWEI TECHNOLOGIES CO., LTD., Shenzhen (CN)

(72) Inventors: Jian Chen, Shanghai (CN); Pinyang Zou, Shanghai (CN); Hongliang Zhao, Shanghai (CN); Fuhai Dong, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 510 days.

(21) Appl. No.: 14/090,913

(22) Filed: Nov. 26, 2013

(65) Prior Publication Data

US 2014/0222985 A1 Aug. 7, 2014

Related U.S. Application Data

(63) Continuation of application No. PCT/CN2011/074712, filed on May 26, 2011.

(51) Int. Cl.
  *H04L 12/24* (2006.01)
  *H04L 29/08* (2006.01)
(52) U.S. Cl.
  CPC .............. *H04L 41/50* (2013.01); *H04L 67/10* (2013.01)
(58) Field of Classification Search
  CPC ........ H04N 21/418; H04L 41/50; H04L 67/10
  (Continued)

(56) References Cited

U.S. PATENT DOCUMENTS

| 5,450,078 A | 9/1995 | Silva et al. |
| 8,095,470 B1 * | 1/2012 | Seidel ................ H04N 21/4182 705/58 |

(Continued)

FOREIGN PATENT DOCUMENTS

| CN | 1595883 A | 3/2005 |
| CN | 1804887 A | 7/2006 |

(Continued)

OTHER PUBLICATIONS

Chinese Office Action issued on Sep. 24, 2014 in corresponding Chinese Patent Application No. 201180000792.7.

(Continued)

*Primary Examiner* — Kostas Katsikis
*Assistant Examiner* — Billy H Ng
(74) *Attorney, Agent, or Firm* — Staas & Halsey LLP

(57) ABSTRACT

Embodiments of the present invention disclose a method and terminal, an input method and device, a cloud service card, and a system for acquiring a service and relate to the field of cloud computing technologies. A method for acquiring cloud service content according to an embodiment of the present invention includes: acquiring, by a cloud terminal, an identifier of a service card; acquiring, by the cloud terminal, a cloud service instruction set corresponding to the identifier of the cloud service card from a cloud instruction set server according to the identifier of the cloud service card; and acquiring, by the cloud terminal, cloud service content from a cloud service server according to a cloud service instruction in the cloud service instruction set. The present invention is applicable to quick acquisition of a latest cloud service provided by an operator.

13 Claims, 9 Drawing Sheets

(58) Field of Classification Search
USPC .......................................................... 709/223
See application file for complete search history.

(56) References Cited

U.S. PATENT DOCUMENTS

| | | | |
|---|---|---|---|
| 8,121,268 B1* | 2/2012 | Ferguson | H04M 3/4938 379/88.17 |
| 9,137,302 B1* | 9/2015 | Makhijani | H04L 67/1002 |
| 2002/0069127 A1* | 6/2002 | Enari | G06Q 20/123 705/26.1 |
| 2002/0138837 A1* | 9/2002 | Fries | H04N 5/4401 725/55 |
| 2002/0181398 A1* | 12/2002 | Szlam | H04M 3/42229 370/230 |
| 2003/0149981 A1* | 8/2003 | Finster | H04N 5/44543 725/46 |
| 2005/0261988 A1* | 11/2005 | Horel | G06Q 30/02 705/26.8 |
| 2006/0212541 A1* | 9/2006 | Ueshima | G06Q 20/123 709/219 |
| 2007/0274500 A1 | 11/2007 | Bai et al. | |
| 2009/0167490 A1* | 7/2009 | Hayaashi | G06Q 20/12 340/5.8 |
| 2011/0106635 A1* | 5/2011 | Khan | G06Q 20/12 705/14.73 |
| 2011/0107379 A1* | 5/2011 | Lajoie | H04L 65/1016 725/87 |
| 2011/0145891 A1* | 6/2011 | Bade | H04L 63/101 726/4 |
| 2011/0264748 A1* | 10/2011 | Pouzin | G06F 9/5011 709/206 |
| 2012/0192263 A1* | 7/2012 | Lin | H04L 67/1097 726/12 |
| 2013/0073608 A1 | 3/2013 | Hu et al. | |

FOREIGN PATENT DOCUMENTS

| | | |
|---|---|---|
| CN | 1991715 | 7/2007 |
| CN | 101093594 A | 12/2007 |
| CN | 101557551 A | 10/2009 |
| CN | 101562723 A | 10/2009 |
| CN | 101800881 A | 8/2010 |
| CN | 101827241 A | 9/2010 |
| CN | 101860819 A | 10/2010 |
| CN | 102025786 A | 4/2011 |
| CN | 102055730 A | 5/2011 |
| TW | 341340 | 9/1998 |

OTHER PUBLICATIONS

Chinese Search Report issued on Sep. 15, 2014 in corresponding Chinese Patent Application No. 2011800007927.
PCT International Search Report and Written Opinion of the International Searching Authority mailed Mar. 15, 2012 in corresponding International Application No. PCT/CN2011/074712.

\* cited by examiner

METHOD AND TERMINAL, INPUT METHOD AND DEVICE, CLOUD SERVICE CARD, AND SYSTEM FOR ACQUIRING SERVICE

CROSS-REFERENCE TO RELATED APPLICATIONS

This application is a continuation of International Application No. PCT/CN2011/074712, filed on May 26, 2011, which is hereby incorporated by reference in its entirety.

TECHNICAL FIELD

Embodiments of the present invention relate to the fields of cloud computing and Internet technologies, and in particular, to a method and terminal, an input method and device, a cloud service card, and a system for acquiring a service.

BACKGROUND

Currently, there are many methods for acquiring services by inserting a service card, for example, a learning machine. When a user inserts a service card into a terminal or an input device, the terminal identifies an identifier of the service card and responds according to an operation instruction to execute a corresponding program.

However, when such a method is used, all provided services need to be prestored in a terminal device, and therefore, it is inconvenient to update provided service content. In addition, because all the services are fixed, it brings great inconvenience for a user to flexibly acquire new service content, for a service provider to provide new service content, and even for adjusting service charges, and the like.

SUMMARY

Embodiments of the present invention provide a method and terminal, an input method and device, a cloud service card, and a system for acquiring a service, so as to enable a user to conveniently acquire a latest service.

In one aspect, an embodiment of the present invention provides a method for acquiring a service, specifically including: acquiring, by a cloud terminal, an identifier of a service card; acquiring, by the cloud terminal, a cloud service instruction set corresponding to the identifier of the cloud service card from a cloud instruction set server according to the identifier of the cloud service card; and acquiring, by the cloud terminal, cloud service content from a cloud service server according to a cloud service instruction in the cloud service instruction set.

In another aspect, an embodiment of the present invention further provides a terminal, including: a first acquiring module, configured to acquire an identifier of a service card; a second acquiring module, configured to acquire a cloud service instruction set corresponding to the identifier of the cloud service card from a cloud instruction set server according to the identifier of the cloud service card; and a third acquiring module, configured to acquire cloud service content from a cloud service server according to a cloud service instruction in the cloud service instruction set.

In another aspect, an embodiment of the present invention further provides an input method, including: when a cloud input device and a cloud service card are connected, acquiring an identifier of the service card; and sending, by the cloud input device, to a cloud terminal, a message carrying the identifier of the cloud service card, so that the cloud terminal acquires a cloud service instruction set corresponding to the identifier of the cloud service card from a cloud instruction set server according to the identifier of the cloud service card.

In another aspect, an embodiment of the present invention further provides an input device, including: a first acquiring module, configured to: when a cloud input device and a cloud service card are connected, acquire an identifier of the service card; and a first sending module, configured to send, to a cloud terminal, a message carrying the identifier of the cloud service card, so that the cloud terminal acquires a cloud service instruction set corresponding to the identifier of the cloud service card from a cloud instruction set server according to the identifier of the cloud service card.

Embodiments of the present invention further provide a cloud service card, including: an identifying module, configured to identify the cloud service card, so as to enable a cloud terminal to acquire, according to an identifier, a cloud service instruction set corresponding to the identifier from a cloud instruction set server; and an output module, only configured to provide an identifier included in the identifying module.

An embodiment of the present invention further provides a system for acquiring a service, including a cloud service server, a cloud instruction set server, a cloud terminal, and a cloud service card, where the cloud terminal is configured to acquire an identifier of a service card, acquire a cloud service instruction set corresponding to the identifier of the cloud service card from the cloud instruction set server according to the identifier of the cloud service card, and acquire cloud service content from a cloud service server according to a cloud service instruction in the cloud service instruction set; the cloud service card includes an identifying module, configured to identify the cloud service card, so as to enable the cloud terminal to acquire, according to the identifier, the cloud service instruction set corresponding to the identifier from the cloud instruction set server, and an output module, only configured to provide an identifier included in the identifying module; the cloud instruction set server is configured to send the cloud service instruction set to the cloud terminal according to the identifier of the cloud service card; and the cloud service server is configured to provide service content for the cloud terminal according to the cloud service instruction set or the cloud service instruction.

According to the method, apparatus, and system for acquiring a service that are provided in the embodiments of the present invention, a cloud terminal acquires an identifier of a service card, acquires a cloud service instruction set corresponding to the cloud service card from a cloud instruction set server according to the identifier of the cloud service card, and acquires cloud service content from a cloud service server according to a cloud service instruction in the cloud service instruction set. In the embodiments of the present invention, because the acquired cloud service content is acquired from the service server according to the service instruction, it is convenient to obtain a latest service.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
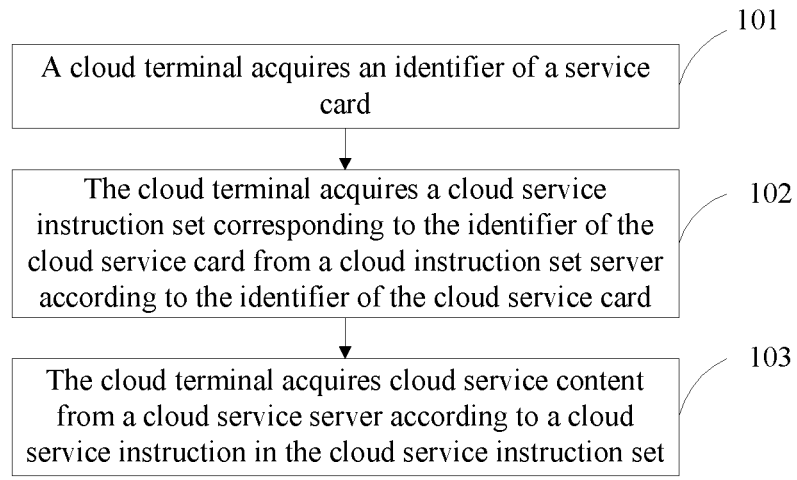
FIG. 1 is a schematic flowchart of a method for acquiring a service according to an embodiment of the present invention.

An embodiment of the present invention provides a method for acquiring a service. FIG. 1 is a schematic flowchart of a method for acquiring a service according to an embodiment of the present invention. As shown in FIG. 1, the method includes:

101. A cloud terminal acquires an identifier of a service card.

It should be understood that, because of different connection manners between the cloud terminal and the cloud service card and different information transmission manners, the cloud terminal may use multiple methods to acquire the identifier of the service card.

From the viewpoint as to selection of a wired or wireless connection, the cloud terminal may acquire the identifier of the service card through a wired link or acquire the identifier of the service card through a wireless link.

From the viewpoint as to whether the cloud terminal and the cloud service card are associated through another device, when the cloud service card is directly connected to the cloud terminal, the cloud terminal may directly acquire identifier information of the cloud service card that is sent by the service card. It may be appreciated that, such a direct acquiring method may be wired or wireless.

When the cloud terminal and the cloud service card are not directly connected, for example, when the cloud service card is first connected to a cloud input device, and after acquiring the identifier information of the cloud service card, the cloud input device sends the identifier information to the cloud terminal. In this case, the cloud terminal may acquire the identifier information of the cloud service card that is sent by the cloud input device.

For another example, when the cloud terminal and the cloud service card are not directly connected, after acquiring the identifier information of the cloud service card, the cloud input device may not only send the identifier information of the cloud service card to the cloud terminal but also send other information, for example, a cloud service card connection message, to the cloud terminal and carry the identifier information of the cloud service card in the cloud service card connection message. In this case, the cloud terminal acquires the cloud service card connection message sent by the cloud input device, where the cloud service card connection message includes the identifier information of the cloud service card.

102. The cloud terminal acquires a cloud service instruction set corresponding to the identifier of the cloud service card from a cloud instruction set server according to the identifier of the cloud service card.

After obtaining the identifier information of the cloud service card, the cloud terminal may proactively send the identifier information of the cloud service card to the cloud instruction set server, or the cloud instruction set server acquires the information from the cloud terminal. Its acquiring manner may be implemented by the prior art and is not limited in this embodiment of the present invention.

The cloud terminal acquires the cloud service instruction set corresponding to the identifier of the cloud service card from the cloud instruction set server according to the obtained identifier of the cloud service card. It should be understood that, the cloud service instruction set acquired by the cloud terminal may be proactively sent by the cloud instruction set server or sent by the cloud instruction set server for responding to a request of the cloud terminal, another request, or other received trigger signals, which is also not limited herein.

Further, this step may include:

The cloud terminal sends a request message for acquiring a service instruction set to the cloud instruction set server, where the request message includes the identifier of the cloud service card and an identifier of the cloud terminal. This manner may also be one manner of proactively sending, by the cloud terminal, the identifier information of the cloud service card to the cloud instruction set server.

The cloud terminal receives the cloud service instruction set sent after the cloud instruction set server performs authentication according to the identifier of the cloud service card and information about the cloud terminal. Because specific authentication is performed by the cloud instruction set server, details are not provided herein.

103. The cloud terminal acquires cloud service content from a cloud service server according to a cloud service instruction in the cloud service instruction set.

It should be understood that, after acquiring the cloud service instruction set delivered by the cloud instruction set server, the cloud terminal acquires the cloud service content from the cloud service server according to a specific cloud service instruction in the received cloud service instruction set.

In this embodiment, a cloud terminal acquires an identifier of a service card, acquires a cloud service instruction set corresponding to the cloud service card from a cloud instruction set server according to the identifier of the cloud service card, and acquires cloud service content from a cloud service server according to a cloud service instruction in the cloud service instruction set. In this embodiment of the present invention, because the acquired cloud service content is acquired from the service server according to the service instruction, even if the cloud service card does not change, the identifier of the cloud service card does not change, and the cloud terminal does not change, as long as content on the server changes, a user can acquire a changed service. Therefore, this embodiment of the present invention enables the user to conveniently obtain a latest service.

Figure 2:
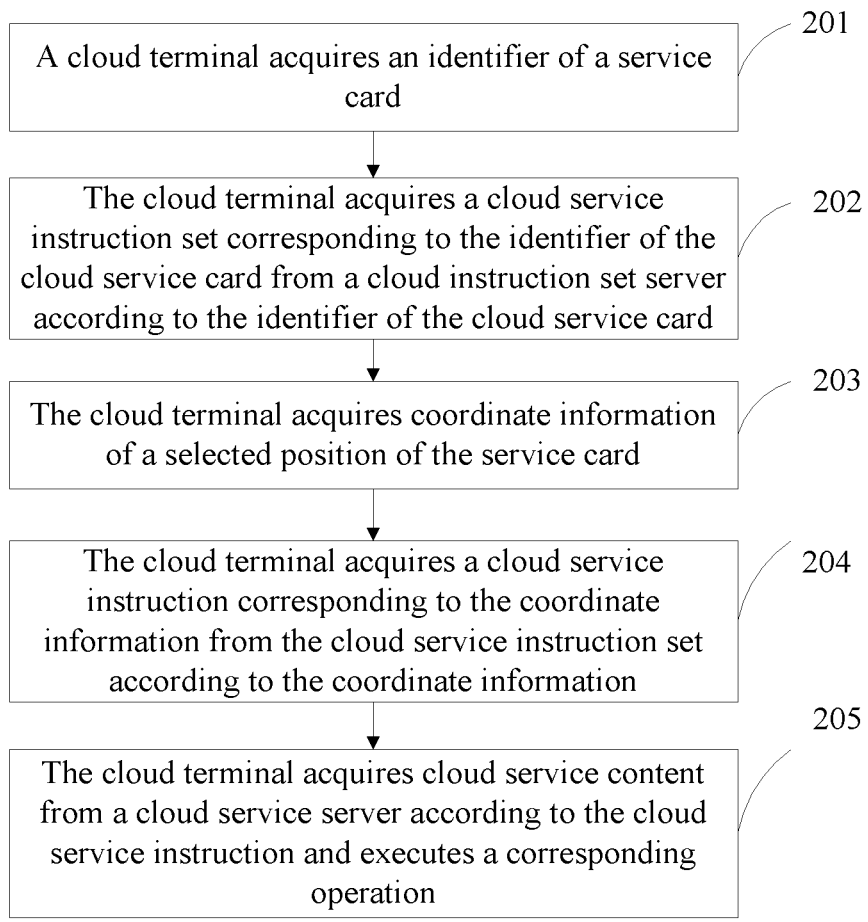
FIG. 2 is a schematic flowchart of a method for acquiring a service according to another embodiment of the present invention.

Another embodiment of the present invention provides a method for acquiring a service. FIG. 2 is a schematic flowchart of a method for acquiring a service according to another embodiment of the present invention. As shown in FIG. 2, the method includes:

201. A cloud terminal acquires an identifier of a service card.

For a specific implementation manner, reference may be made to the previous embodiment.

202. The cloud terminal acquires a cloud service instruction set corresponding to the identifier of the cloud service card from a cloud instruction set server according to the identifier of the cloud service card.

For a specific implementation manner, reference may be made to the previous embodiment.

203. The cloud terminal acquires coordinate information of a selected position of the service card.

When a position on the cloud service card is selected, the cloud terminal acquires coordinate information of the selected position of the service card.

It should be understood that, because of different connection manners between the cloud terminal and the cloud service card and different information transmission manners, the cloud terminal may use multiple methods to acquire the coordinate information of the selected position of the service card.

Similar to step 101 in the previous embodiment, in step 203, the cloud terminal may directly acquire the coordinate information sent by the service card or the cloud terminal may also acquire the coordinate information sent by a cloud input device. It may be appreciated that, the selected position of the cloud service card may be selected by a user through the method of clicking or selected in another manner, which is not limited herein. The position corresponds to a piece of preset coordinate information. When the user clicks a position, a piece of coordinate information corresponds to the position; or when the user clicks in an area, all positions in the area have same coordinate information.

204. The cloud terminal acquires a cloud service instruction corresponding to the coordinate information from the cloud service instruction set according to the coordinate information.

As can be seen from 203, each position on the service card corresponds to corresponding coordinate information. After acquiring the coordinate information, the cloud terminal may acquire the cloud service instruction corresponding to the coordinate information from the cloud service instruction set obtained in 202 according to the coordinate information. A specific acquiring method may be a method such as search or comparison, which is not limited in this embodiment of the present invention.

It should be understood that, the cloud service instruction set may include multiple cloud service instructions, and the cloud service instructions may match or correspond to different node areas. In all node areas corresponding to or matching the cloud service instructions in the acquired cloud service instruction set, a node area corresponding to the selected position of the cloud service card is searched according to the coordinate information.

Specifically, it may be that a node area of each node in nodes of the cloud service instruction set is specified, the coordinate information is compared with node areas to search for a "node area" of a node in which coordinates corresponding to the coordinate information are located, thereby locating a node to which the coordinates belong. In this way, the selected position of the cloud service card is matched with a specific cloud service instruction in the cloud service instruction set, that is, the cloud service instruction corresponding to the coordinate information is acquired from the cloud service instruction set according to the selected position of the cloud service card.

205. The cloud terminal acquires cloud service content from a cloud service server according to the cloud service instruction and executes a corresponding operation.

It should be understood that, a specific cloud service instruction is a specific instruction of a service that the user wants to obtain, and according to the specific instruction, the cloud terminal may acquire the cloud service content from the cloud service server and executes the corresponding operation.

Further, a specific implementation manner may include the following:

The cloud terminal acquires node type and node content information included in the service instruction.

For example, a "node type" refers to a specific service type. For example, it may be specified that the cloud service instruction is for opening a web page, playing a video, executing a program, used as a keyboard or a touch area, or the like. Any type that can be implemented by the prior art may be used as the node type in this embodiment of the present invention, which is not enumerated herein.

In addition, "node content" may refer to specific service content, for example, specific content that is specified. For example, when the node type is opening a web page, the node content specifies a specific web page to be opened; when the node type is playing a video, the node content specifies a specific video to be played, and so on.

The cloud terminal acquires the cloud service content from the cloud service server according to the node type and node content information.

The cloud terminal acquires the cloud service content from the cloud service server according to the obtained node type and node content information and executes the corresponding operation. It should be understood that, here, the executing a corresponding operation may be executing the corresponding operation by the cloud terminal itself or enabling, by the cloud terminal through an interface, an execution device with a corresponding function to execute a specific operation.

Alternatively, in another specific implementation manner, the cloud terminal acquires node attributes included in the service instruction, and the node attributes further are specifically as follows:

The node attributes may include a type of an area in which a node is located, an operation area of the node, an operation type of the node, operation content, and the like. The area type is used to indicate that an operation area is a rectangle, a circle, or the like; the operation area indicates a coordinate range of an area; the operation type is a type, such as pressing a key on a keyboard, clicking a mouse, playing a video, and making a telephone call, that indicates how to trigger or show operation content; and the operation content is a true meaning to be triggered through an operation, such as pressing the "A" key on a keyboard.

When the user clicks in an area of the cloud service card, the cloud input device detects position coordinates of a position clicked by the user and sends the position coordinates to the cloud terminal. According to the received position coordinates, the cloud terminal first searches for an "operation area" of a node in which the position coordinates are located from all nodes of a cloud operation instruction set, thereby locating a node to which the coordinates belong, then, determines, according to an "area type", that the area is a system area, a user area, or the like, then, determines that an "operation type" is opening a web page, playing a video, executing a program, or the like, and then uses "operation content" as a parameter to invoke a function provided by the cloud terminal to acquire cloud service content specified by the "operation content".

The foregoing two manners are only exemplary. Node attributes may be set in a different degree according to needs, multiple attributes may be set to meet multiple requirements, and fewer attributes may be set to meet requirements as simple as possible, which is not limited in the present invention.

Further, in this embodiment of the present invention, the following may further be included:

The cloud terminal acquires the cloud service content from the cloud service server according to the cloud service instruction set.

It should be understood that, it may specifically be that content of a main window corresponding to the identifier of the cloud service card is displayed.

Further, in this step, the cloud terminal may acquire cloud service content corresponding to the identifier of the service card according to the cloud service instruction set. For example, after acquiring the cloud service instruction set, the cloud terminal parses the cloud service instruction set and acquires and executes the service content according to information such as a type of the cloud service card and content of the cloud service card.

Specifically, the following may be included:

The cloud terminal acquires the cloud service card type and the cloud service card content information that are included in the service instruction set.

It should be understood that, the cloud service instruction set corresponding to the identifier of the service card includes the cloud service card type and the cloud service card content. The terminal acquires the cloud service card type and the cloud service card content information specified, and its specific acquiring manner may be implemented by the prior art and is not limited herein.

The cloud terminal acquires and executes the cloud service content from the cloud service server according to the cloud service card type and the cloud service card content information.

The cloud terminal acquires the cloud service content from the cloud service server according to the foregoing obtained the cloud service card type and the cloud service card content information specified. A specific obtaining method may be obtaining by the cloud terminal through a request or proactively sending by the cloud service server. The specific method does not affect implementation of the present invention. For example, the type of the cloud service card may include a corresponding operation to be executed by the cloud service card or a type of a service to be provided, and the content of the cloud service card may include content of a corresponding service to be provided by the cloud service card. A specific type and content may be any one in the prior art and are not limited in the present invention. For a specific example, reference may be made to the node type and the node content. Its specific execution manner may be executing the corresponding operation by the cloud terminal itself or enabling, by the cloud terminal through an interface, an execution device with a corresponding function to execute a specific operation.

Moreover, in the foregoing two embodiments, the cloud service instruction set may be an instruction set that corresponds to the cloud service card and is preset on the cloud instruction set server, and cloud service content may be service content that corresponds to the cloud service card and is preset on the cloud service server.

In this embodiment of the present invention, a specific cloud service instruction is acquired from a service instruction set by acquiring coordinate information of a selected position of a service card, thereby finally acquiring cloud service content from a cloud service server and executing a corresponding operation, so that a user can obtain a finer service. An operator may provide a service updated in real time for the user through an instruction set that is preset on a cloud instruction set server and service content that is preset on the cloud service server.

Figure 3:
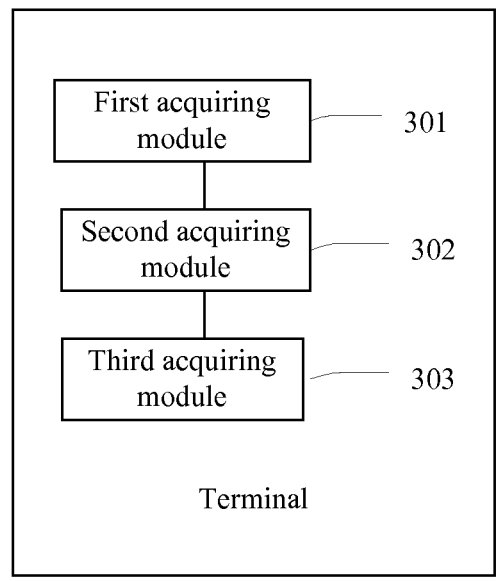
FIG. 3 is a schematic structural diagram of a terminal according to an embodiment of the present invention.

An embodiment of the present invention provides a terminal. FIG. 3 is a schematic structural diagram of a terminal according to an embodiment of the present invention. As shown in FIG. 3, the terminal includes a first acquiring module 301, a second acquiring module 302, and a third acquiring module 303, where:

the first acquiring module 301 is configured to acquire an identifier of a service card;

the second acquiring module 302 is configured to acquire a cloud service instruction set corresponding to the identifier of the cloud service card from a cloud instruction set server according to the identifier of the cloud service card; and the third acquiring module 303 is configured to acquire cloud service content from a cloud service server according to a cloud service instruction in the cloud service instruction set.

For specific content executed by the first acquiring module 301, the second acquiring module 302, and the third acquiring module 303 in this embodiment of the present invention, reference may be made to the method embodiments.

In this embodiment, a first acquiring module acquires an identifier of a service card, a second acquiring module acquires a cloud service instruction set corresponding to the cloud service card from a cloud instruction set server according to the identifier of the cloud service card, and a third acquiring module acquires cloud service content from a cloud service server according to a cloud service instruction in the cloud service instruction set. In this embodiment of the present invention, because the acquired cloud service content is acquired from the service server according to the service instruction, it is convenient to obtain a latest service.

Figure 4:
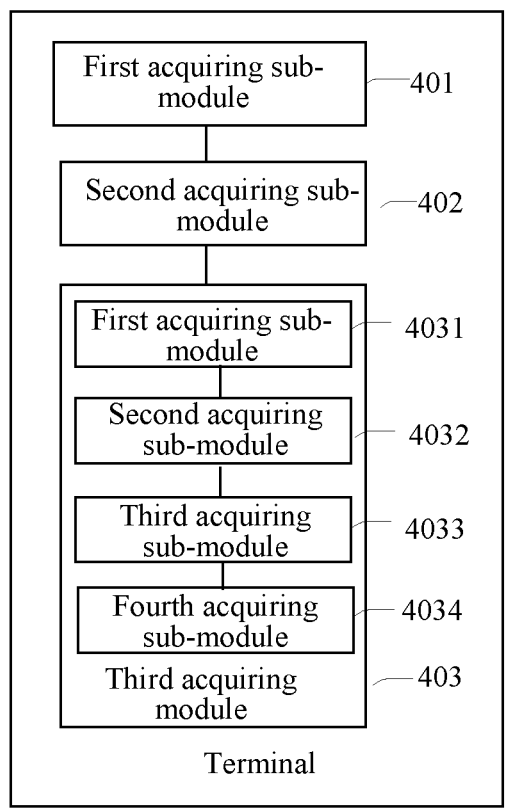
FIG. 4 is a schematic structural diagram of a terminal according to another embodiment of the present invention.

Another embodiment of the present invention provides a terminal. FIG. 4 is a schematic structural diagram of a terminal according to another embodiment of the present invention. As shown in FIG. 4, the terminal includes a first acquiring module 401, a second acquiring module 402, and a third acquiring module 403. For their specific execution content, reference may be made to the previous embodiment. The third acquiring module 403 further includes:

a first acquiring sub-module 4031, configured to acquire coordinate information of a selected position of the service card;

a second acquiring sub-module 4032, configured to acquire a cloud service instruction corresponding to the coordinate information from the cloud service instruction set according to the coordinate information; and a third acquiring sub-module 4033, configured to acquire the cloud service content from the cloud service server according to the cloud service instruction and execute a corresponding operation.

For specific operations executed by the foregoing modules, reference may be made to a corresponding method embodiment, and details are not provided herein.

Further, the third acquiring module may further include:

a fourth acquiring sub-module 4034, configured to acquire content of a main window corresponding to the identifier of the service card according to the cloud service instruction set.

Further, the second acquiring module 402 may further include:

a first sending sub-module 4021, configured to send a request message for acquiring a service instruction set to the cloud instruction set server, where the request message includes the identifier of the cloud service card and an identifier of the cloud terminal; and a first receiving sub-module 4022, configured to receive the cloud service instruction set sent after the cloud instruction set server performs authentication according to the identifier of the cloud service card and information about the cloud terminal.

Moreover, the first acquiring module 401 may include one of the following sub-modules:

a fifth acquiring sub-module, configured to directly acquire identifier information of the cloud service card that is sent by the service card;

a sixth acquiring sub-module, configured to acquire identifier information of the cloud service card that is sent by a cloud input device; and a seventh acquiring sub-module, configured to acquire a cloud service card connection message sent by a cloud input device, where the cloud service card connection message includes identifier information of the cloud service card.

Figure 5:
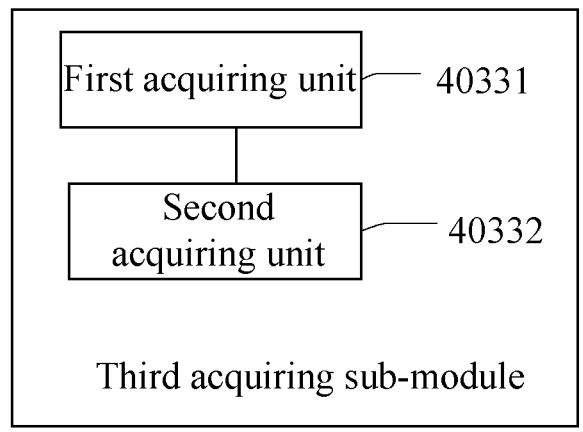
FIG. 5 is a schematic structural diagram of a third acquiring sub-module according to an embodiment of the present invention.

FIG. 5 is a schematic structural diagram of a third acquiring sub-module according to an embodiment of the present invention. As shown in FIG. 5, the third acquiring sub-module 4033 includes:

a first acquiring unit 40331, configured to acquire node area and node type information included in the service instruction; and a second acquiring unit 40332, configured to acquire the cloud service content from the cloud service server according to the node area and node type information.

Figure 6:
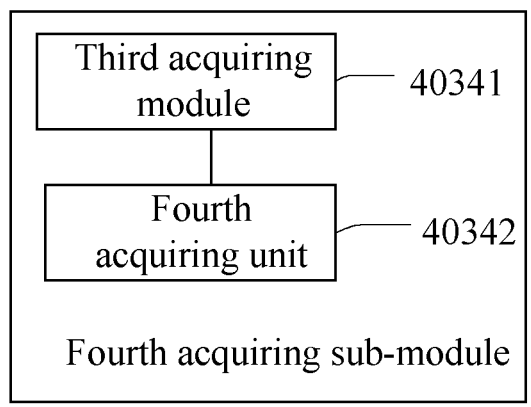
FIG. 6 is a schematic structural diagram of a fourth acquiring sub-module according to an embodiment of the present invention.

FIG. 6 is a schematic structural diagram of a fourth acquiring sub-module according to an embodiment of the present invention. As shown in FIG. 6, the fourth acquiring sub-module 4034 includes:

a third acquiring unit 40341, configured to acquire the cloud service card type and the cloud service card content information that are included in a service instruction set; and a fourth acquiring unit 40342, configured to acquire the cloud service content from the cloud service server according to the the cloud service card type and the cloud service card content information.

It should be understood that, for a specific execution method of each module, sub-module, or unit in the foregoing apparatus embodiments, reference may be made to a corresponding method embodiment. An apparatus in the foregoing embodiment may be a cloud terminal. The cloud terminal may be integrated with an input device, may be directly connected to a service card, or may also be separated from an input device and connected to a service card through the input device.

In this embodiment of the present invention, a first acquiring sub-module acquires coordinate information of a selected position of a service card, a second acquiring sub-module acquires a specific cloud service instruction from a service instruction set, and a third acquiring sub-module finally acquires cloud service content from a cloud service server and executes a corresponding operation, so that a user is can obtain a finer service. An operator may provide a service updated in real time for the user through an instruction set that is preset on a cloud instruction set server and service content that is preset on the cloud service server.

Figure 7:
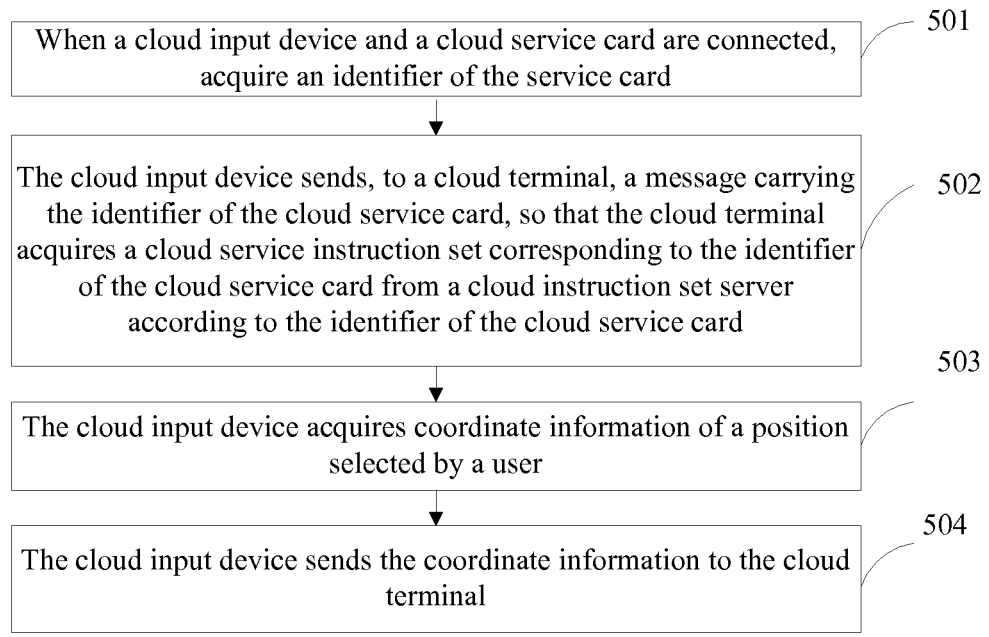
FIG. 7 is a schematic flowchart of an input method according to an embodiment of the present invention.

An embodiment of the present invention provides an input method. FIG. 7 is a schematic flowchart of an input method according to an embodiment of the present invention. As shown in FIG. 7, the method includes:

501. When a cloud input device and a cloud service card are connected, acquire an identifier of the service card.

It should be understood that, because of different connection manners between the cloud input device and the cloud service card and different information transmission manners, the cloud input device may use multiple methods to acquire the identifier of the service card. For example, when a connection between the cloud input device and the cloud service card is a wired connection, it may be performed by inserting the cloud service card into the cloud input device. When a connection between the cloud input device and the cloud service card is a wireless connection, they may be connected wirelessly by Wi-Fi, Bluetooth, or the like, which is not limited in the present invention.

502. The cloud input device sends, to a cloud terminal, a message carrying the identifier of the cloud service card, so that the cloud terminal acquires a cloud service instruction set corresponding to the identifier of the cloud service card from a cloud instruction set server according to the identifier of the cloud service card.

The sending, by the cloud input device, to a cloud terminal, a message carrying the identifier of the cloud service card may specifically be sending, by the cloud input device, a message to the cloud terminal, where the message only includes identifier information of the cloud service card, or sending, by the cloud input device, a message to the cloud terminal, where the message includes other information, such as information for notifying the cloud terminal that the cloud service card is connected to the cloud input device, and includes identifier information of the cloud service card at the same time.

The identifier of the cloud service card may enable the cloud terminal to acquire the cloud service instruction set corresponding to the identifier of the cloud service card from the cloud instruction set server according to the identifier of the cloud service card.

Further, this embodiment of the present invention may further include:

503. The cloud input device acquires coordinate information of a position selected by a user.

A selected position of the cloud service card may be selected by the user through the method of clicking or selected in another manner, which is not limited herein. The position corresponds to a piece of preset coordinate information. When the user clicks a position, a piece of coordinate information corresponds to the position; or when the user clicks in an area, all positions in the area have same coordinate information. The cloud input device acquires the coordinate information of the position selected by the user according to correspondence between a position selected by the user and coordinate information.

504. The cloud input device sends the coordinate information to the cloud terminal.

Specifically, the cloud input device may send the coordinate information to the cloud terminal by using any prior art. Further, the coordinate information may enable the cloud terminal to acquire a specific cloud service instruction from the acquired cloud service instruction set, thereby acquiring specific cloud service content from a cloud service server.

In this embodiment of the present invention, a message carrying an identifier of a cloud service card that is sent by a cloud input device to a cloud terminal may enable the cloud terminal to acquire a cloud service instruction set corresponding to the identifier of the cloud service card from a cloud instruction set server according to the identifier of the cloud service card, so that when the cloud service card and the identifier of the cloud service card do not change, the cloud terminal also can obtain a latest service provided by a server.

Figure 8:
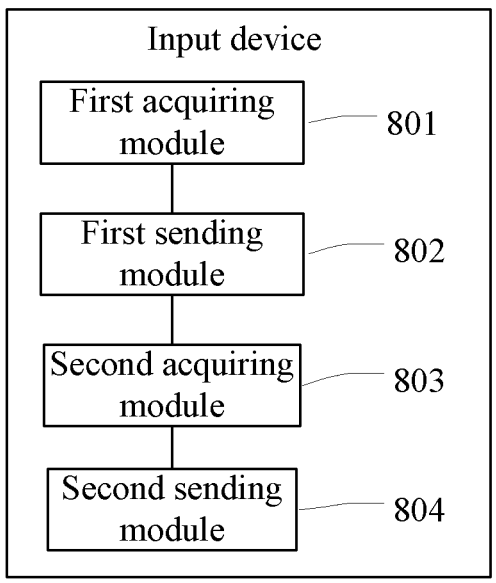
FIG. 8 is a schematic structural diagram of an input device according to an embodiment of the present invention.

An embodiment of the present invention provides an input device. FIG. 8 is a schematic structural diagram of an input device according to an embodiment of the present invention. As shown in FIG. 8, the device includes:

a first acquiring module 801, configured to: when a cloud input device and a cloud service card are connected, acquire an identifier of the service card; and a first sending module 802, configured to send, to a cloud terminal, a message carrying the identifier of the cloud service card, so that the cloud terminal acquires a cloud service instruction set corresponding to the identifier of the cloud service card from a cloud instruction set server according to the identifier of the cloud service card.

Further, the device includes:

a second acquiring module 803, configured to acquire coordinate information of a position selected by a user; and a second sending module 804, configured to send the coordinate information to the cloud terminal.

For specific operations executed by the foregoing modules, reference may be made to a corresponding method embodiment.

In this embodiment of the present invention, a first sending module sends a message with an identifier of a cloud service card that is acquired by a first acquiring module to a cloud terminal, so that the cloud terminal acquires a cloud service instruction set corresponding to the identifier of the cloud service card from a cloud instruction set server according to the identifier of the cloud service card, so that when the cloud service card and the identifier of the cloud service card do not change, the cloud terminal also can obtain a latest service provided by a server.

Figure 9:
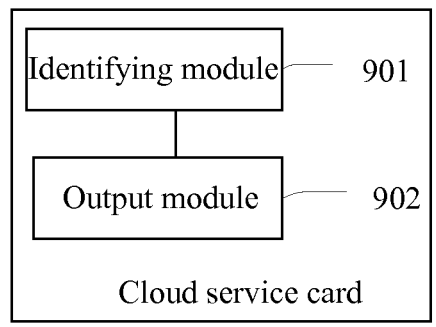
FIG. 9 is a schematic structural diagram of a cloud service card according to an embodiment of the present invention.

Embodiment 7 of the present invention provides a cloud service card. FIG. 9 is a schematic structural diagram of a cloud service card according to an embodiment of the present invention. As shown in FIG. 9, the cloud service card includes:

An identifying module 901 is configured to identify the cloud service card, wherein the identifying enables a cloud terminal to acquire, according to an identifier, a cloud service instruction set corresponding to the identifier from a cloud instruction set server.

Specifically, the identifier may be expressed in manners such as, but not limited to, a two-dimensional code, a watermark code, and a bar code. In addition, the identifier may have a sufficient length to express a country code, an operator code, a cloud service provider code, a specific cloud service code, a serial number, and the like, which is not limited herein.

As mentioned in the foregoing embodiments, an identifier of a cloud service card includes a plain code or a secret code, where the secret code is an encrypted identifier. For a cloud service card whose identifier is a secret code, after being used initially, the cloud service card is bound with a current cloud terminal or cloud input device, and the cloud service card after being bound cannot be used on another cloud terminal or cloud input device.

An output module 902 is only configured to provide the identifier included in the identifying module.

It may be appreciated that, the output module only provides an identifier of a service card, so that the cloud terminal acquires a latest cloud service instruction set and cloud service content according to the identifier.

Further, the identifier may be an encrypted identifier or an identifier not encrypted. In this embodiment of the present invention, the identifier may be implemented by the prior art, such as a two-dimension code.

In addition, in this embodiment of the present invention, the cloud service card may be a card of various materials, for example, a paper card or a card with a storage function, which is not limited in the present invention.

For specific operations executed by the foregoing modules, reference may be made to a corresponding method embodiment.

The identifier in the identifying module of the cloud service card in this embodiment of the present invention enables the cloud terminal to acquire the cloud service instruction set corresponding to the identifier from the cloud instruction set server according to the identifier, so that the cloud terminal can obtain an updated service in a case that the cloud service card does not change.

Figure 10:
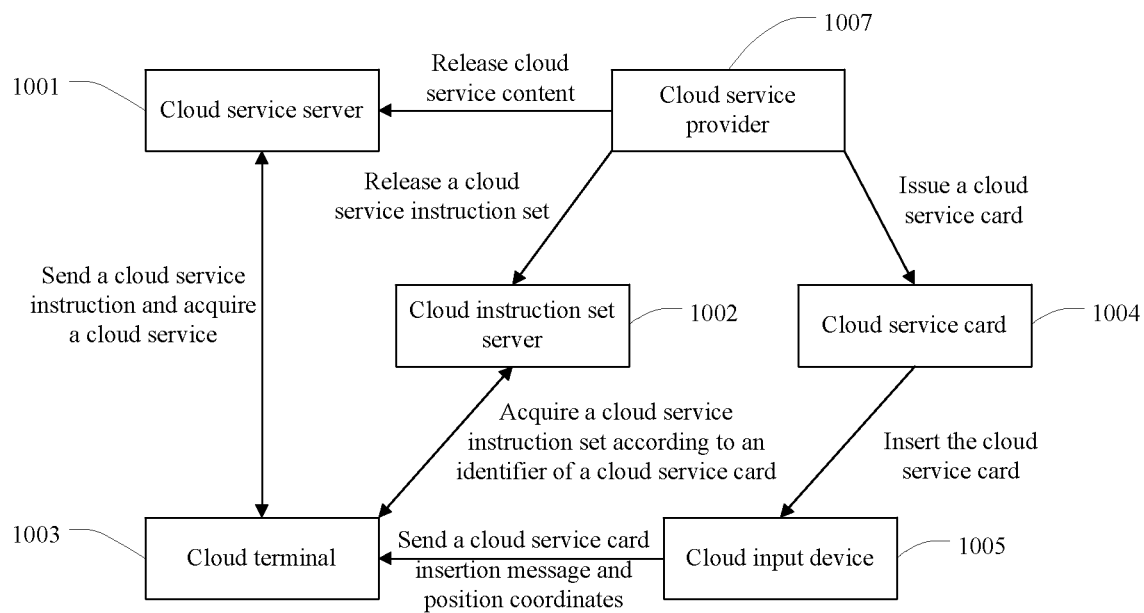
FIG. 10 is a schematic framework diagram of a system according to an embodiment of the present invention.

Embodiment 8 of the present invention provides a system. FIG. 10 is a schematic framework diagram of a system according to an embodiment of the present invention. As shown in FIG. 10, the system includes a cloud service server 1001, a cloud instruction set server 1002, a cloud terminal 1003, and a cloud service card 1004. In FIG. 10, for easier understanding, a cloud service provider 1007 is further embodied. It should be understood that, the cloud service provider releases cloud service content on the cloud service server, releases a cloud service instruction set on the cloud instruction set server, and can update them in real time according to needs.

The cloud terminal is configured to acquire an identifier of a service card, acquire a cloud service instruction set corresponding to the identifier of the cloud service card from the cloud instruction set server according to the identifier of the cloud service card, and acquire cloud service content from the cloud service server according to a cloud service instruction in the cloud service instruction set. Specifically, the cloud terminal may be further configured to search for a cloud service instruction corresponding to position coordinates of a selected position on the cloud service card from the cloud service instruction set and send an acquired cloud service instruction to the cloud service server, so as to acquire the cloud service content and perform a corresponding operation.

The cloud service card includes an identifying module, configured to identify the cloud service card, wherein the identifying enables the cloud terminal to acquire, according to an identifier, the cloud service instruction set corresponding to the identifier from the cloud instruction set server, and an output module, only configured to provide the identifier included in the identifying module.

The cloud instruction set server is configured to send the cloud service instruction set to the cloud terminal according to the identifier of the cloud service card.

The cloud service server is configured to provide service content for the cloud terminal according to the cloud service instruction set or the cloud service instruction.

Further, the system may further include a cloud input device 1005, configured to: when the cloud input device and the cloud service card are connected, acquire the identifier of the service card, where the cloud input device sends, to the cloud terminal, a message carrying the identifier of the cloud service card, so that the cloud terminal acquires the cloud service instruction set corresponding to the identifier of the cloud service card from the cloud instruction set server according to the identifier of the cloud service card.

Moreover, the cloud input device is configured to acquire position coordinates of a selected position on the service card and send the acquired position coordinates of the selected position on the cloud service card to the cloud terminal, where the selected position is specified by a user.

Further, the cloud instruction set server is further configured to: before sending the cloud service instruction set to the cloud terminal, perform, according to the identifier of the cloud service card and information about the cloud terminal, authentication on a request message sent by the cloud terminal.

Specifically, the performing authentication by the cloud instruction set server may include: authenticating validity of the identifier of the cloud service card; or when the identifier of the cloud service card is an encrypted identifier and the cloud service card does not have a bound cloud terminal, binding the cloud service card with a current cloud terminal, so that the cloud service card is only capable of being used on the current cloud terminal; or when the identifier of the cloud service card is an encrypted identifier and the cloud service card has a bound cloud terminal, determining that a current cloud terminal of the cloud service card is consistent with the bound cloud terminal.

Certainly, the cloud service card may also be bound with an input device. After being used initially, the cloud service card is bound with a current cloud terminal or cloud input device, and the cloud service card after being bound cannot be used on another cloud terminal or cloud input device.

After the cloud terminal acquires the identifier of the cloud service card, the system in this embodiment of the present invention acquires the service instruction set according to the identifier and acquires a service from the cloud service server according to the cloud service instruction in the cloud service instruction set. Therefore, the cloud terminal can acquire a latest service when the service content in the cloud service server changes.

The present invention uses a "cloud" concept to isolate a cloud service instruction set, cloud service content, and the like from a cloud terminal, reduce a coupling degree, and handle a binding relationship between a cloud input device and the cloud terminal, that is, content opened by using the cloud input device may change according to needs in a case that the cloud service card does not change. The cloud service instruction set is stored on a cloud instruction set server, and a cloud service provider may update the cloud service instruction set and cloud service content at any time. The cloud terminal receives a cloud service card insertion message sent by the cloud input device and acquires a latest cloud service instruction set from the cloud instruction set server or updates an existing cloud service instruction set of the cloud terminal to a latest cloud service instruction set. In this way, when updating an information service, a cloud service operator may enable a user to obtain a latest service with no need of replacing a cloud service card of a customer.

According to the method, apparatus, and system for acquiring a service that are provided in the embodiments of the present invention, a cloud service provider issues a cloud service card, releases a cloud service instruction set corresponding to the cloud service card on a cloud instruction set server, and releases cloud service content corresponding to the cloud service card on a cloud service server; a cloud terminal determines a specific cloud service instruction according to a position selected by a user on the cloud service card and sends the cloud service instruction to the cloud service server to acquire and display the cloud service content. By using the method provided in the present invention, the user can open resources with one click and quickly obtain desired cloud service content only by selecting a desired service on the cloud service card. Moreover, cost of issuing the cloud service card is low. In addition, it is very convenient to upgrade and update the cloud service instruction set, and the cloud terminal can download a latest cloud service instruction set from the cloud instruction set server in real time, enabling the user to conveniently acquire latest cloud service content in real time.

Figure 11:
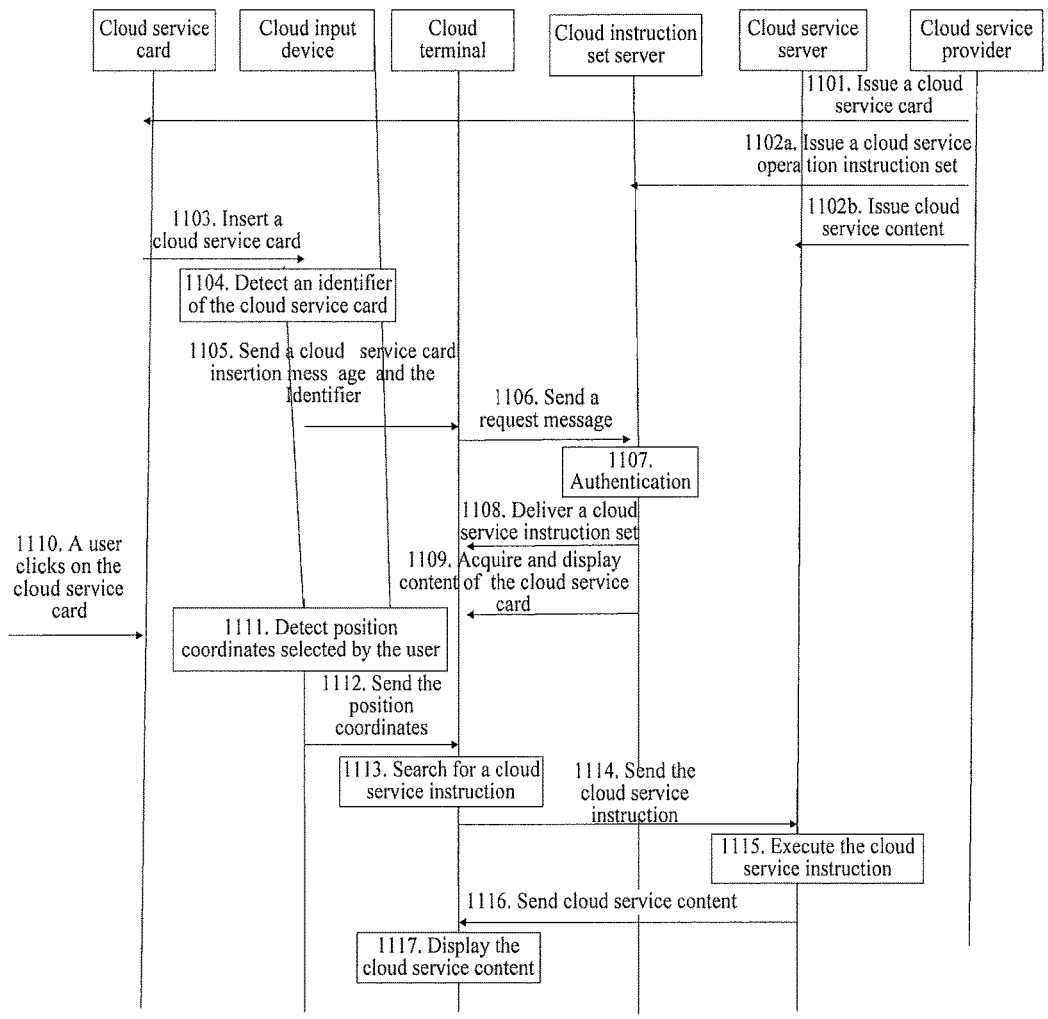
FIG. 11 is a schematic flowchart of a specific method according to still another embodiment of the present invention.

To describe the embodiments of the present invention in detail, still another embodiment of the present invention provides a specific implementation method. To facilitate understanding, a scenario description is added in this specific embodiment. FIG. 11 is a schematic flowchart of a specific method according to still another embodiment of the present invention. As shown in FIG. 11, this method embodiment includes:

1101. A cloud service provider issues a cloud service card.

1102. The cloud service provider releases a cloud service instruction set corresponding to the cloud service card on a cloud instruction set server and releases cloud service content corresponding to the cloud service card on a cloud service server.

1103. A user inserts the cloud service card into a cloud input device.

1104. The cloud input device detects a cloud service card identifier of the inserted cloud service card.

1105. The cloud input device sends a cloud service card insertion message and the cloud service card identifier of the inserted cloud service card to a cloud terminal.

1106. The cloud terminal sends a request message for acquiring a latest cloud service instruction set to the cloud instruction set server, so as to obtain the latest cloud service instruction set, where the request message includes the identifier of the cloud service card and an identifier of the cloud terminal.

1107. The cloud instruction set server performs authentication on the request message. In one aspect, the authentication includes authenticating validity of the identifier of the cloud service card; in another aspect, when the identifier of the cloud service card is an encrypted identifier, the cloud instruction set server binds the cloud service card with a current cloud terminal, so that the cloud service card can only be used on the current cloud terminal.

1108. The cloud terminal receives the cloud service instruction set delivered by the cloud instruction set server, where the cloud service instruction set corresponds to the identifier of the cloud service card.

1109. The cloud terminal acquires the cloud service content corresponding to the identifier of the cloud service card from the cloud service server and automatically displays a main window of the card.

1110. The cloud input device detects selected position coordinates on the cloud service card, where a selected position is specified by the user.

1111 and 1112. The cloud input device detects the position coordinates and sends the detected position coordinates to the cloud terminal.

1113. The cloud terminal searches, according to the position coordinates selected by the user on the cloud service card, the cloud service instruction set for a cloud service instruction corresponding to the position selected by the user.

1114. The cloud terminal sends the acquired cloud service instruction to the cloud service server.

1115. The cloud service server executes the received cloud service instruction to determine the cloud service content.

1116. The cloud service server sends the cloud service content to the cloud terminal.

1117. The cloud terminal acquires the cloud service content and executes a corresponding operation.

In this embodiment of the present invention, because acquired cloud service content is acquired from a service server according to a service instruction, even if a cloud service card does not change, an identifier of the cloud service card does not change, and a cloud terminal does not change, as long as content on the server changes, a user can acquire a changed service. Therefore, this embodiment of the present invention enables the user to conveniently obtain a latest service.

Figure 12:
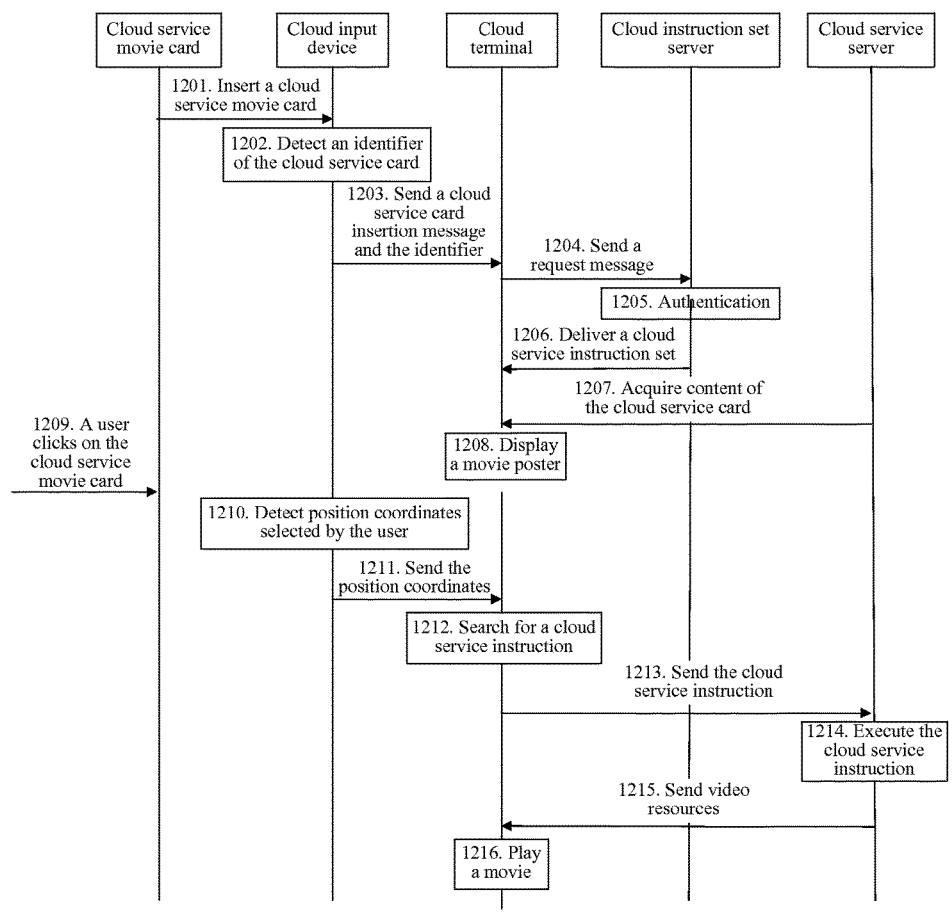
FIG. 12 is a schematic flowchart of a method for acquiring a service in a scenario of watching a movie according to an embodiment of the present invention.

A method for acquiring a service according to an embodiment of the present invention is described by still using a specific scenario. This embodiment provides a method for acquiring a service, in which a movie can be quickly watched through the Internet. FIG. 12 is a schematic flowchart of a method for acquiring a service in a scenario of watching a movie according to an embodiment of the present invention. As shown in FIG. 12, the method includes:

1201. A cloud input device detects that a cloud service card is inserted.

1202. The cloud input device detects an identifier of the inserted cloud service card.

1203. The cloud input device sends a cloud service card insertion message to a cloud terminal, where the cloud service card insertion message includes the identifier of the inserted cloud service card.

1204. The cloud terminal sends a request message for acquiring a latest cloud service instruction set to a cloud instruction set server, where the request message includes a cloud service card identifier of a cloud service movie card and an identifier of the cloud terminal.

1205. The cloud instruction set server receives the request message sent by the cloud terminal, performs authentication according to information included in the request message, such as the identifier of the cloud service card and the cloud terminal, and determines that the cloud service movie card is valid.

1206. The cloud instruction set server delivers a latest cloud service instruction set corresponding to the cloud service movie card to the cloud terminal.

1207. The cloud terminal acquires content of a main window of the cloud service card corresponding to the cloud service movie card from a cloud service server, that is, acquires the content of the main window according to the identifier of the cloud service card.

1208. The cloud terminal determines that the content of the main window of the cloud service card is a poster picture of a movie and displays the poster picture, that is, the cloud terminal determines a type of the cloud service card.

1209. The cloud input device detects position coordinates of a selected position on the inserted cloud service card, where the selected position is specified by a user.

1210 and 1211. The cloud input device detects the position coordinates and sends the detected position coordinates to the cloud terminal.

1212. The cloud terminal searches the cloud service instruction set for a cloud service instruction corresponding to the position coordinates sent by the cloud input device.

1213. The cloud terminal sends the acquired cloud service instruction to the cloud service server.

1214. The cloud service server executes the received cloud service instruction and acquires video resources of a movie selected by the user.

1215. The cloud service server sends the acquired video resources of the movie selected by the user to the cloud terminal.

1216. The cloud terminal plays the selected movie according to the received video resources.

According to the method for acquiring a service that is provided in this embodiment of the present invention, a cloud terminal determines, according to an identifier of a cloud service movie card inserted by a user, that the inserted cloud service card is a cloud service movie card and acquires a latest cloud service instruction set from a cloud instruction set server; the cloud terminal acquires content of a main window corresponding to the cloud service card from a cloud service server according to the identifier of the inserted cloud service card and displays the content, determines a specific cloud service instruction according to position coordinates, detected by a cloud input device, of a selected position on the inserted cloud service card, and sends the cloud service instruction to the cloud service server, so as to acquire video resources of a movie selected by the user and display the video resources on the cloud terminal. By using the present invention, the user can open network resources with one click, and an operation process is simple. This enables the user to conveniently and quickly watch the selected movie.

Figure 13:
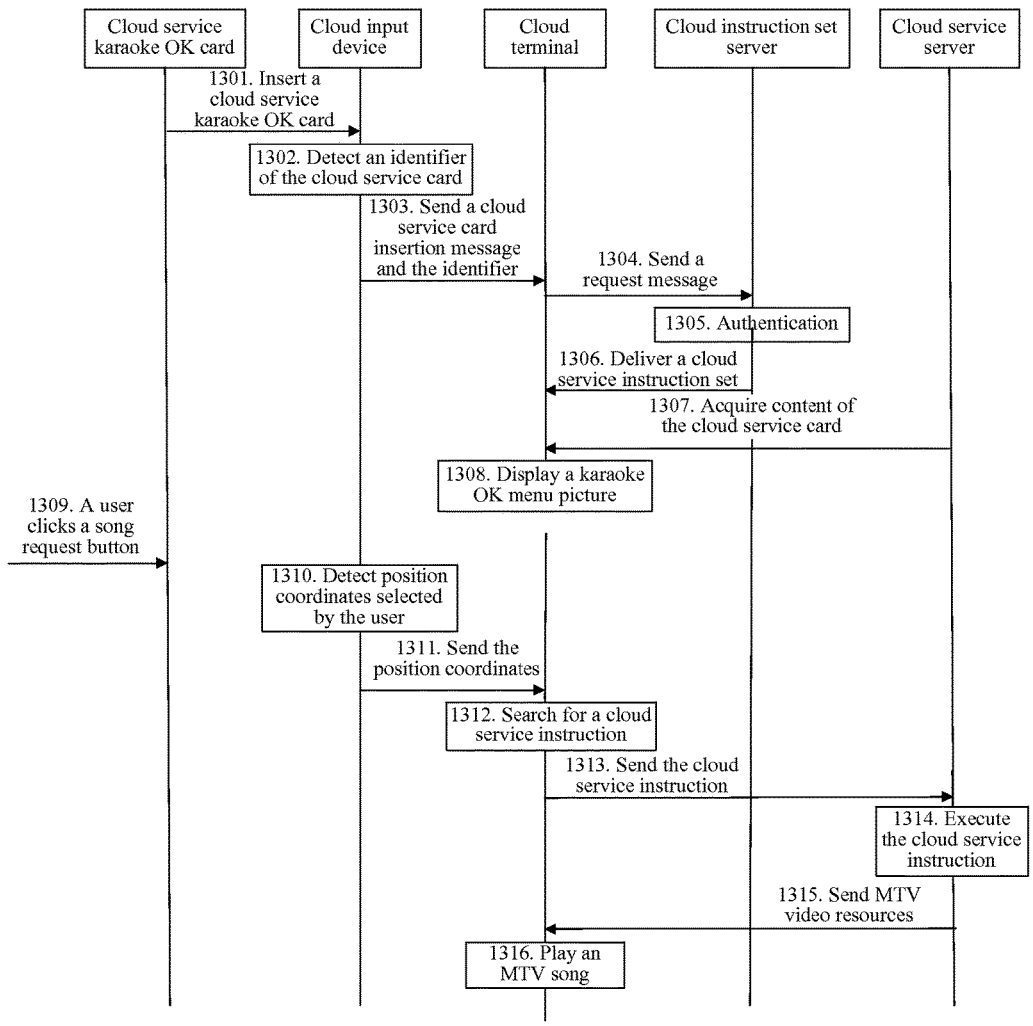
FIG. 13 is a schematic flowchart of a method for acquiring a service in a scenario of karaoke OK on demand according to an embodiment of the present invention.

A method for acquiring a service according to an embodiment of the present invention is described in this embodiment by using a specific scenario of karaoke OK on demand. This embodiment provides a method for acquiring a service. FIG. 13 is a schematic flowchart of a method for acquiring a service in a scenario of karaoke OK on demand according to an embodiment of the present invention. As shown in FIG. 13, the method includes:

1301. A cloud input device detects that a cloud service card is inserted.

1302. The cloud input device detects a cloud service card identifier of the inserted cloud service karaoke OK card.

1303. The cloud input device sends a cloud service card insertion message to a cloud terminal, where the cloud service card insertion message includes the identifier of the inserted cloud service card.

1304. The cloud terminal sends a request message for acquiring a latest cloud service instruction set to a cloud instruction set server, where the request message includes the cloud service card identifier of the cloud service karaoke OK card and an identifier of the cloud terminal.

1305. The cloud instruction set server receives the request message sent by the cloud terminal, performs authentication according to information included in the request message, such as the identifier of the cloud service card and the cloud terminal, and determines that the cloud service karaoke OK card is valid.

1306. The cloud instruction set server delivers a cloud service instruction set corresponding to the cloud service karaoke OK card to the cloud terminal.

1307. The cloud terminal acquires content of a main window of the cloud service card corresponding to the cloud service karaoke OK card from a cloud service server.

1308. The cloud terminal determines that the content of the main window of the cloud service card is a karaoke OK menu picture and displays the picture.

1309. The cloud input device detects position coordinates of a selected position on the inserted cloud service card, where the selected position is specified by a user.

1310 and 1311. The cloud input device detects the position coordinates and sends the detected position coordinates to the cloud terminal.

1312. The cloud terminal searches the cloud service instruction set for a cloud service instruction corresponding to the position coordinates sent by the cloud input device.

1313. The cloud terminal sends the acquired cloud service instruction to the cloud service server.

1314. The cloud service server executes the received cloud service instruction and acquires MTV video resources of a karaoke OK song selected by the user.

1315. The cloud service server sends the acquired MTV video resources to the cloud terminal.

1316. The cloud terminal plays an MTV and music according to the received MTV video resources.

According to the method for acquiring a service that is provided in this embodiment of the present invention, a cloud terminal determines, according to an identifier of a cloud service karaoke OK card inserted by a user, that the inserted cloud service card is a cloud service karaoke OK card and acquires a latest cloud service instruction set from a cloud instruction set server; the cloud terminal acquires content of a main window corresponding to the cloud service card from a cloud service server according to the identifier of the inserted cloud service card and displays the content; and determines a specific cloud service instruction according to position coordinates, detected by a cloud input device, of a selected position on the inserted cloud service card, and the cloud instruction set server sends the cloud service instruction to the cloud service server, so as to acquire MTV video resources of a karaoke OK song selected by the user, display the MTV video resources on the cloud terminal, and play music. By using the present invention, the user can directly select a requested song, so that the user can quickly request karaoke OK.

Figure 14:
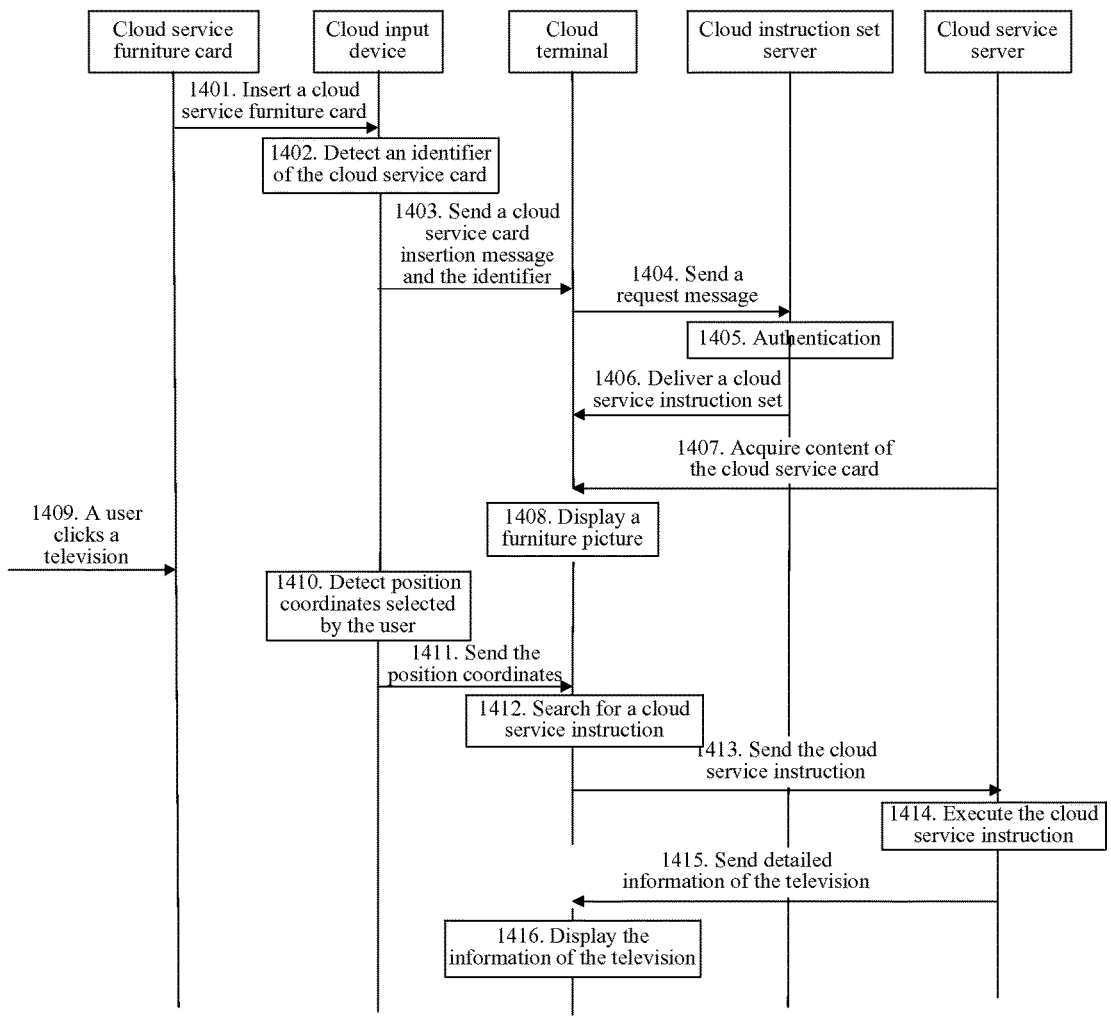
FIG. 14 is a schematic flowchart of a method for acquiring a service in a scenario of purchasing furniture according to an embodiment of the present invention.

A method for acquiring a service according to an embodiment of the present invention is described in this embodiment by using a specific scenario of purchasing furniture. This embodiment provides a method for acquiring a service. FIG. 14 is a schematic flowchart of a method for acquiring a service in a scenario of purchasing furniture according to an embodiment of the present invention. As shown in FIG. 14, the method includes:

1401. A cloud input device detects that a cloud service card is inserted.

1402. The cloud input device detects an identifier of the inserted cloud service card.

1403. The cloud input device sends a cloud service card insertion message to a cloud terminal, where the cloud service card insertion message includes the identifier of the inserted cloud service card.

1404. The cloud terminal sends a request message for acquiring a latest cloud service instruction set to a cloud instruction set server, where the request message includes a cloud service card identifier of a cloud service furniture card and an identifier of the cloud terminal.

1405. The cloud instruction set server receives the request message sent by the cloud terminal, performs authentication according to information included in the request message, such as the identifier of the cloud service card and the cloud terminal, and determines that the cloud service furniture card is valid.

1406. The cloud instruction set server delivers a latest cloud service instruction set corresponding to the cloud service furniture card to the cloud terminal.

1407. The cloud terminal acquires content of a main window of the cloud service card corresponding to the cloud service furniture card from a cloud service server.

1408. The cloud terminal determines that the content of the main window of the cloud service card is a furniture picture and displays the picture.

1409. The cloud input device detects position coordinates of a selected position on the inserted cloud service card, where the selected position is specified by a user.

1410. The cloud input device sends the detected position coordinates to the cloud terminal.

1411. The cloud terminal searches the cloud service instruction set for a cloud service instruction corresponding to the position coordinates sent by the cloud input device.

1412. The cloud terminal sends the acquired cloud service instruction to the cloud service server.

1413. The cloud service server executes the received cloud service instruction and acquires information such as detailed information of a television selected by the user and contact information for purchase.

1414. The cloud service server sends the acquired information such as the detailed information of the television selected by the user and the contact information for purchase to the cloud terminal.

1415. The cloud terminal displays the received detailed information of the television to provide reference for the user.

According to the method for acquiring a service that is provided in this embodiment of the present invention, a cloud terminal determines, according to an identifier of a cloud service furniture card inserted by a user, that the inserted cloud service card is a cloud service furniture card and acquires a latest cloud service instruction set from a cloud instruction set server; the cloud terminal acquires content of a main window corresponding to the cloud service card from a cloud service server according to the identifier of the inserted cloud service card and displays the content; and determines a specific cloud service instruction according to position coordinates, detected by a cloud input device, of a selected position on the inserted cloud service card, and sends the cloud service instruction the cloud service server, so as to acquire detailed information of furniture selected by the user and display the detailed information on the cloud terminal. By using the present invention, the user can directly select furniture the user is interested in, and an operation process is simple. This enables the user to conveniently and quickly grasp the detailed information of the selected furniture.

In all embodiments of the present invention, the cloud service card may be an online shopping poster, a VOD (Video On Demand, video on demand technology) poster, or a cloud storage poster, which is not limited herein.

The cloud terminal may access a network through an MUAP (Multimedia UMTS Access Point, multimedia universal mobile telecommunications system access point, where the UMTS is Universal Mobile Telecommunications System, that is, universal mobile telecommunications system), an STB (Set Top Box, set top box), a network television, or the like, which is not limited herein.

The cloud input device may be a WIID (Wireless Intelligent Input Device, wireless intelligent input board), which is not limited herein.

Through the foregoing description of the embodiments, it is clear to a person skilled in the art that, the present invention may be implemented by software plus necessary universal hardware, and definitely may also be implemented by hardware, but in many cases, the software implementation is preferred. Based on such an understanding, the technical solutions of the present invention essentially, or the part contributing to the prior art may be implemented in a form of a software product. The computer software product is stored in a readable storage medium, for example, a floppy disk, a hard disk, or an optical disk of the computer, and includes several instructions for instructing a computer device (which may be a personal computer, a server, a network device, or the like) to perform the methods described in the embodiments of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for acquiring a service, comprising:
    acquiring, by a cloud terminal, an identifier of a cloud service card;
    acquiring, by the cloud terminal, a cloud service instruction set corresponding to the identifier of the cloud service card from a cloud instruction set server according to the identifier of the cloud service card; and
    acquiring, by the cloud terminal, cloud service content from a cloud service server according to a cloud service instruction in the cloud service instruction set by:
        acquiring, by the cloud terminal, coordinate information of a selected position of the cloud service card;
        acquiring, by the cloud terminal, the cloud service instruction corresponding to the coordinate information from the cloud service instruction set according to the coordinate information;
        acquiring, by the cloud terminal, the cloud service content from the cloud service server according to the cloud service instruction and executing a corresponding operation; and
        acquiring, by the cloud terminal, the cloud service content from the cloud service server according to the cloud service instruction set by:
        acquiring, by the cloud terminal, a cloud service card type and a cloud service card content information included in the cloud service instruction set; and
        acquiring, by the cloud terminal, the cloud service content from the cloud service server according to the cloud service card type and the cloud service card content information.

2. The method according to claim 1, wherein the acquiring, by the cloud terminal, the cloud service content from the cloud service server according to the cloud service instruction comprises:
    acquiring, by the cloud terminal, node type and node content information included in the cloud service instruction; and
    acquiring, by the cloud terminal, the cloud service content from the cloud service server according to the node type and node content information.

3. The method according to claim 1, wherein the acquiring, by the cloud terminal, a cloud service instruction set corresponding to the identifier of the cloud service card from a cloud instruction set server according to the identifier of the cloud service card comprises:
    sending, by the cloud terminal, a request message for acquiring a service instruction set to the cloud instruction set server, wherein the request message comprises the identifier of the cloud service card and an identifier of the cloud terminal; and
    receiving, by the cloud terminal, the cloud service instruction set sent after the cloud instruction set server performs authentication according to the identifier of the cloud service card and information about the cloud terminal.

4. The method according to claim 1, wherein the acquiring, by a cloud terminal, an identifier of a service card comprises:
    directly acquiring, by the cloud terminal, identifier information of the cloud service card that is sent by the cloud service card; or
    acquiring, by the cloud terminal, identifier information of the cloud service card that is sent by a cloud input device; or
    acquiring, by the cloud terminal, a cloud service card connection message sent by a cloud input device, wherein the cloud service card connection message comprises identifier information of the cloud service card.

5. A terminal, comprising:
    at least one hardware processor; and
    a memory including instructions which when executed, control the at least one hardware processor to implement:
        a first acquiring module, configured to acquire an identifier of a cloud service card;
        a second acquiring module, configured to acquire a cloud service instruction set corresponding to the identifier of the cloud service card from a cloud instruction set server according to the identifier of the cloud service card; and
        a third acquiring module, configured to acquire cloud service content from a cloud service server according to a cloud service instruction in the cloud service instruction set, the third acquiring module comprising:

a first acquiring sub-module, configured to acquire coordinate information of a selected position of the cloud service card;

a second acquiring sub-module, configured to acquire the cloud service instruction corresponding to the coordinate information from the cloud service instruction set according to the coordinate information;

a third acquiring sub-module, configured to acquire the cloud service content from the cloud service server according to the cloud service instruction and execute a corresponding operation; and a fourth acquiring sub-module, configured to acquire the cloud service content from the cloud service server according to the cloud service instruction set, the fourth acquiring sub-module comprising:

a third acquiring unit, configured to acquire a cloud service card type and a cloud service card content information included in the cloud service instruction set; and a fourth acquiring unit, configured to acquire the cloud service content from the cloud service server according to the cloud service card type and the cloud service card content information.

6. The terminal according to claim 5, wherein the third acquiring sub-module comprises:

a first acquiring unit, configured to acquire node type and node content information included in the cloud service instruction; and a second acquiring unit, configured to acquire the cloud service content from the cloud service server according to the node type and node content information.

7. The terminal according to claim 5, wherein the second acquiring module comprises:

a first sending sub-module, configured to send a request message for acquiring a service instruction set to the cloud instruction set server, wherein the request message comprises the identifier of the cloud service card and an identifier of the terminal; and a first receiving sub-module, configured to receive the cloud service instruction set sent after the cloud instruction set server performs authentication according to the identifier of the cloud service card and information about the terminal.

8. The terminal according to claim 5, wherein the first acquiring module comprises:

a fifth acquiring sub-module, configured to directly acquire identifier information of the cloud service card that is sent by the cloud service card; or a sixth acquiring sub-module, configured to acquire identifier information of the cloud service card that is sent by a cloud input device; or a seventh acquiring sub-module, configured to acquire a cloud service card connection message sent by a cloud input device, wherein the cloud service card connection message comprises identifier information of the cloud service card.

9. A system, comprising:
a plurality of computers to implement:
a cloud service server;
a cloud instruction set server;
a cloud terminal; and
a cloud service card, wherein:
the cloud terminal is configured to acquire an identifier of the cloud service card, acquire a cloud service instruction set corresponding to the identifier of the cloud service card from the cloud instruction set server according to the identifier of the cloud service card, and acquire cloud service content from the cloud service server according to a cloud service instruction in the cloud service instruction set by:

acquiring, by the cloud terminal, coordinate information of a selected position of the cloud service card;

acquiring, by the cloud terminal, the cloud service instruction corresponding to the coordinate information from the cloud service instruction set according to the coordinate information;

acquiring, by the cloud terminal, the cloud service content from the cloud service server according to the cloud service instruction and executing a corresponding operation; and acquiring, by the cloud terminal, the cloud service content from the cloud service server according to the cloud service instruction set by:

acquiring, by the cloud terminal, a cloud service card type and a cloud service card content information included in the cloud service instruction set; and acquiring, by the cloud terminal, the cloud service content from the cloud service server according to the cloud service card type and the cloud service card content information;

the cloud service card comprises:
an identifying module, configured to identify the cloud service card, wherein the identifying enables the cloud terminal to acquire, according to an identifier, the cloud service instruction set corresponding to the identifier from the cloud instruction set server, and an output module configured to provide the identifier comprised in the identifying module;

the cloud instruction set server is configured to send the cloud service instruction set to the cloud terminal according to the identifier of the cloud service card; and the cloud service server is configured to provide cloud service content for the cloud terminal according to the cloud service instruction set or the cloud service instruction.

10. The system according to claim 9, further comprising a cloud input device, configured to: when the cloud input device and the cloud service card are connected, acquire the identifier of the cloud service card, wherein the cloud input device sends, to the cloud terminal, a message carrying the identifier of the cloud service card, so that the cloud terminal acquires the cloud service instruction set corresponding to the identifier of the cloud service card from the cloud instruction set server according to the identifier of the cloud service card.

11. The system according to claim 9, wherein the cloud instruction set server is further configured to: before sending the cloud service instruction set to the cloud terminal, perform, according to the identifier of the cloud service card and information about the cloud terminal, authentication on a request message sent by the cloud terminal.

12. The system according to claim 11, wherein the performing authentication by the cloud instruction set server comprises:

authenticating validity of the identifier of the cloud service card; or when the identifier of the cloud service card is an encrypted identifier and the identifier of the cloud service card does not have a bound cloud terminal, binding the cloud service card with a current cloud terminal, so that the cloud service card is only capable of being used on the current cloud terminal; or when the identifier of the cloud service card is an encrypted identifier and the cloud service card has a bound cloud terminal, determining that a current cloud terminal of the cloud service card is consistent with the bound cloud terminal.

13. An apparatus comprising:

a computer comprising:
- at least one hardware processor; and
- a memory including instructions which when executed, control the computer to:
- implement a cloud terminal configured to acquire an identifier of a cloud service card,
- acquire a cloud service instruction set from among a plurality of cloud service instruction sets and corresponding to the identifier of the cloud service card from a cloud instruction set server according to the identifier of the cloud service card, each cloud service instruction set among the plurality of cloud service instruction sets corresponding to different identifiers of different cloud service cards, and
- acquire cloud service content from a cloud service server according to a cloud service instruction in the cloud service instruction set by:
  - acquiring, by the cloud terminal, coordinate information of a selected position of the cloud service card;
  - acquiring, by the cloud terminal, the cloud service instruction corresponding to the coordinate information from the cloud service instruction set according to the coordinate information;
  - acquiring, by the cloud terminal, the cloud service content from the cloud service server according to the cloud service instruction and executing a corresponding operation; and
  - acquiring, by the cloud terminal, the cloud service content from the cloud service server according to the cloud service instruction set by:
    - acquiring, by the cloud terminal, a cloud service card type and a cloud service card content information included in the cloud service instruction set; and
    - acquiring, by the cloud terminal, the cloud service content from the cloud service server according to the cloud service card type and the cloud service card content information.

* * * * *